United States Patent

[11] 3,525,286

| [72] | Inventors | Thomas Lombardo<br>Lake Orion, Michigan;<br>Joseph Silvagi, Warren, Michigan |
|------|-----------|---|
| [21] | Appl. No. | 742,317 |
| [22] | Filed | July 3, 1968 |
| [45] | Patented | Aug. 25, 1970 |
| [73] | Assignee | Camdale Enterprises<br>Roseville, Michigan<br>a partnership composed of John W.<br>Conforti and Joseph Silvagi |

[54] GEAR SHAPING TOOL
4 Claims, 5 Drawing Figs.

[52] U.S. Cl. ...................................... 90/8,
  90/10, 29/95, 29/103, 77/71, 279/89
[51] Int. Cl. ........................................ B23f 9/06,
  B26d 1/04
[50] Field of Search ............................ 90/8, 10,
  11.1; 29/95.3, 103, 103.1, 103.2, 103.3, 105.1;
  279/83, 89, 90, 91, 1-A; 77/71

[56] References Cited
UNITED STATES PATENTS

| 1,285,869 | 11/1918 | Wineman | 29/103.1 |
| 2,338,095 | 1/1944 | Campbell | 279/83 |
| 2,778,091 | 1/1957 | Palley | 29/103 |
| 3,149,524 | 9/1964 | Vecchi | 279/89X |

FOREIGN PATENTS

| 226,271 | 7/1943 | Switzerland | 90/11 |
| 610,791 | 10/1948 | Great Britain | 29/103 |
| 896,644 | 2/1960 | Great Britain | 29/103.1 |

*Primary Examiner*— Gil Weidenfeld
*Attorney*—Hauke, Gifford and Patalidis

ABSTRACT: A gear shaping tool is disclosed in which a cutting gear is removably attached to a shank so that several gears of different sizes can be attached to a given shank, or a cutting gear can be replaced on the shank without removing the shank from the shaping machine. One embodiment employs an internally mounted spacer in the shank in abutment with the end of the cutting gear to provide means for adjusting the position of the cutting gear with respect to the gear blank.

Patented Aug. 25, 1970
3,525,286
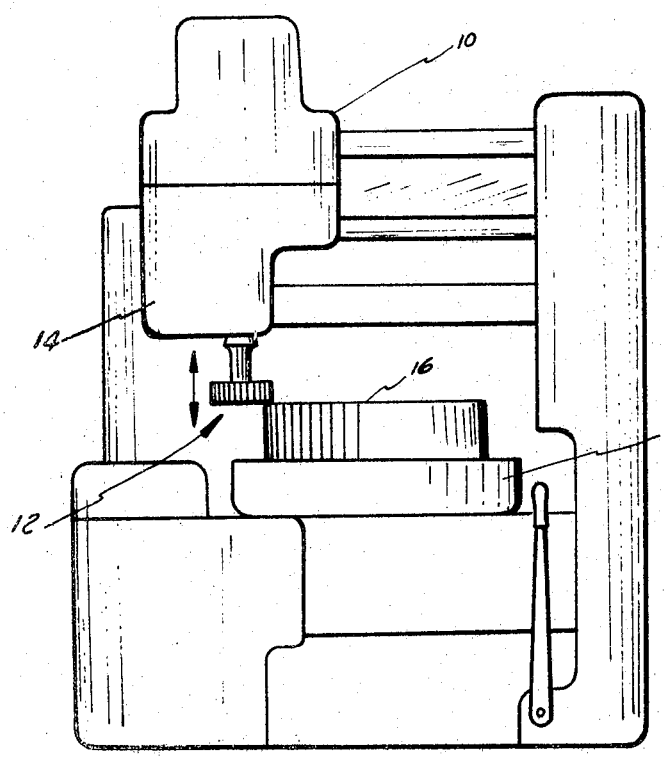
FIG.1
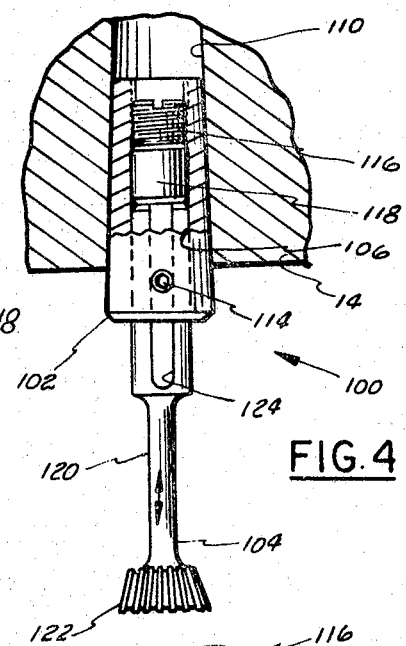
FIG.4
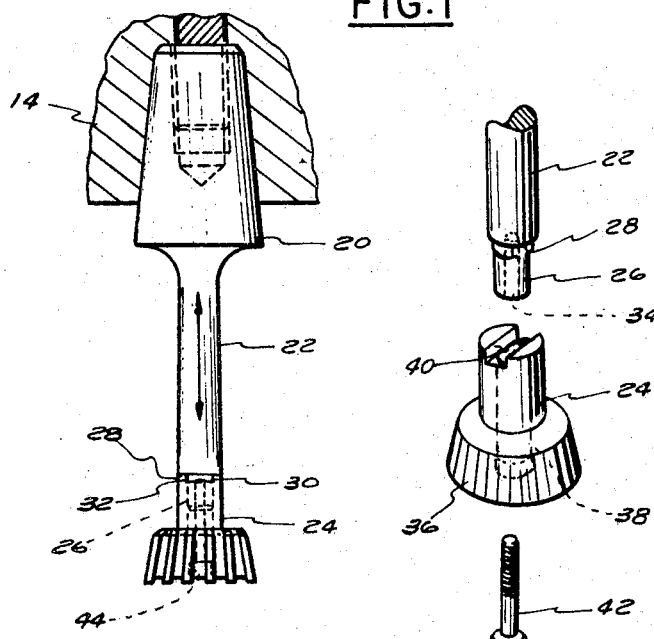
FIG.2
FIG.3
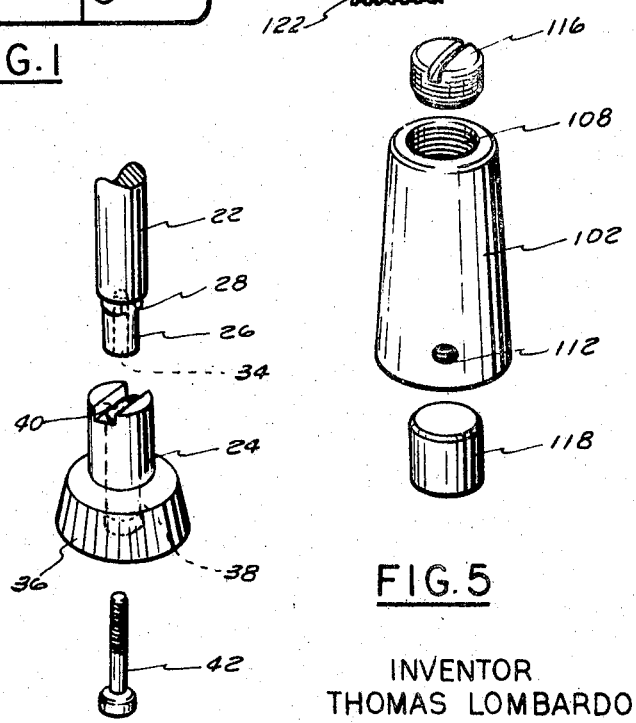
FIG.5
INVENTOR
THOMAS LOMBARDO
JOSEPH SILVAGI
BY
Hauke Knaus Gifford & Patalidis
ATTORNEYS

GEAR SHAPING TOOL

BACKGROUND OF THE INVENTION

This invention relates to gear shaping machines, and more specifically to a tool having a shank with a removably attached cutting gear.

Gear shaping machines normally employ a cutting gear which is integrally formed on the end of an elongated straight shank. The tool is mounted in the machine and reciprocated in a restrained path between a pair of longitudinally spaced positions. It is moved in one direction in a cutting stroke in which the teeth of the cutting gear engage a blank to generate teeth, and in a return direction in which the tool and the blank are rotated about parallel axes to a subsequent cutting position.

Normally a plurality of cutting tools are provided, each having a gear with a different pitch for cutting a gear having a similar pitch.

One problem that is associated with conventional gear-shaping tools is that the stroke of the tool must be greater than the thickness of the blank and must extend beyond both sides of the blank. If the thickness of the blank is varied the position of the cutting gear with respect to the blank must be adjusted by a crank arm mechanism. When this mechanism is adjusted, the blank and the tool must be realigned in a time-consuming procedure. Similarly, if the machine is set up for generating a gear having teeth of a given pitch, the tool must be replaced to change the cutting pitch which also requires a time-consuming alignment procedure.

SUMMARY

The broad purpose of the present invention is to provide a gear-shaping tool so that any of a series of cutting gears can be mounted on a single shank. Thus once the machine has been set up, the cutting head can be replaced without removing the shank from the machine. In addition, the preferred embodiment allows the position of the cutting gear with respect to the blank to be adjusted without adjusting the crank arm mechanism.

The preferred embodiment of the invention comprises an elongated shank adapted for mounting on a conventional gear shaping machine and which can be joined to any one of a set of cutting gears each of a different pitch. Each cutting gear has a longitudinal bore one end of which receives a narrowed end formed on the shank so that the gear is seated on a shoulder of the shank. A threaded fastener locks the gear in its seated position. This arrangement allows the cutting gear to be quickly exchanged when the shank is mounted in the machine without effecting the alignment of the shank. Thus a cutting gear of a given pitch can be quickly exchanged with a gear of another pitch to adapt the machine to generate finished gears with a different profile. In addition, the shoulder on the shank provides a solid back-up for the gear during a cutting stroke.

Another embodiment of the invention comprises a shank which is formed with a longitudinal bore. One end of the bore is threaded for internally mounting a plug adjacent one end, and its other end is adapted to receive the inner end of a tool having a cutting gear formed on its outer end. When the tool is inserted in the shank, it is locked in place by a screw on the shank that engages a flat formed on the side of the tool.

In this embodiment, the distance the cutting gear extends beyond the shank can be adjusted to accommodate changes in the cutting stroke of the tool without adjusting the crank arm mechanism of the machine. The end of the tool is bottomed on a spacer in the bore of the shank. A threaded plug on the opposite side of the spacer retains it in the shank. The distance the cutting gear extends beyond the shank can be varied by either inserting a longer or shorter spacer or adjusting the position of the threaded plug. In this embodiment the tool is also firmly backed up by the plug and the spacer during its cutting stroke.

The construction of the preferred gear shaping tools make feasible a kit of such tools in which a series of cutting gears of different pitches are interchangeable with a series of shanks. One of the main advantages of this arrangement is a reduction in the set-up time when pitches of the cutting gear in the machine is to be changed. The spacers allow the position of the cutting gear to be quickly varied without removing the shank from the machine and without upsetting the alignment of the shank with respect to the blank.

Still other advantages of the present invention will become apparent to those skilled in the art to which the invention pertains upon reference to the following detailed description.

DESCRIPTION OF THE DRAWINGS

The description refers to the accompanying drawing in which like reference characters refer to the like parts throughout the several views and in which:

FIG. 1 is an elevational view of a gear shaping machine in which a cutting tool illustrating the preferred embodiment of the invention is supported for cutting a gear blank;

FIG. 2 is an enlarged view of the cutting tool illustrated in FIG. 1;

FIG. 3 is an exploded view showing the manner in which the cutting gear is mounted on the end of the shank;

FIG. 4 is a view of another embodiment of the invention; and

FIG. 5 is an exploded view of the shank, the spacer and the plug of the tool of FIG. 4.

DESCRIPTION OF THE PREFERRED EMBODIMENT

FIG. 1 illustrates a gear shaping machine 10 in which a gear-shaping tool generally indicated at 12 is mounted in a vertically reciprocating ram 14 for up and down as well as rotational motion. A gear blank 16 is illustrated as being mounted on a bed 18 which is rotated about a vertical axis as the cutting tool 12 is rotated. For purposes of illustration, the machine 10 is of conventional construction and moves the tool 12 down in a cutting stroke, backs it away from the blank 16 before returning it upwardly in a return stroke to a starting position and then advances the tool forward to the blank for a subsequent cutting stroke. In its return stroke, the tool and the work are rotated slightly at a speed ratio that is inversely proportional to their pitch diameters.

Now referring to FIGS. 2 and 3, the cutting tool comprises an elongated shank 20 having a tapered section for mounting the ram 14 and an elongated midsection 22. A cutting tool 24 is mounted on the lower end of the shank. The length of the midsection 22 is sufficient so that as the cutting tool is engaged with the blank, the tapered section of the shank clears the blank. The shank 20 has a narrowed lower end 26 with a diameter that is less than the diameter of the midsection 22 to form a shoulder 28 having a surface that is transverse to the longitudinal axis of the shank. The opposite sides of the midsection 22 immediately adjacent the narrowed end 26 are provided with a pair of flats 30 and 32 which are substantially parallel to one another and are adjacent the shoulder 28. The narrowed end 26 also has a tapped hole 34 which extends axially from its lower end.

The cutting tool 24 is relatively elongated and has a cutting gear 36 on one end and a longitudinal bore 38 which extends between its opposite ends. The bore 38 receives the narrowed end 26 of the shank as the tool is mounted on the shank by a motion parallel to its longitudinal axis to a bottomed position in which the tool is seated on the shoulder 28. The tool 24 also has a transverse slot 40 formed adjacent its upper end which has opposed flat sides which face one another from opposite sides of the bore 38. When the tool 24 is mounted on the end of the shank, the sides of the slot are in face-to-face relationship with the flats 30 and 32 so that the cutting gear cannot be rotated with respect to the shank. A bolt 42 provides means for fastening the tool 24 to the elongated section 22 so that the tool cannot be separated from its bottomed position. The bolt 42 is inserted through the bore to a position in which its threaded end engages the tapped hole 34 of the shank and then is drawn up tight until its head is seated in a countersunk portion 44 of the bore 38.

Thus when the shank 20 is mounted in the gear-shaping machine in proper alignment, the tool 24 can be quickly replaced by another tool having either a similar cutting pitch or a different cutting pitch without upsetting this alignment. The joint between the tool 24 and the shank 20 is such that the tool is firmly, rigidly backed up by the shoulder of the shank as it is advanced in each cutting stroke. In addition, the connection provides a rigid attachment against rotational forces acting on the cutting gear by means of the slot 40 and the flats 30 and 32. The fastener 42 allows the tool to be quickly mounted on or removed from the end of the shank.

Now referring to FIGS. 4 and 5, another embodiment of the invention is illustrated as comprising a cutting tool 100 is illustrated as supported on the ram 14 of the gear-shaping machine. The cutting tool 100 also has a shank 102 which is mounted on the ram and a tool 104 which is removably attached to the shank 102.

The shank 102 is preferably externally tapered in order to accommodate the mounting socket of a conventional gear-shaping machine and is formed with a bore 106 that extends between its opposite longitudinal ends. One end of the bore is threaded as at 108 and the opposite, lower end is adapted to receive the tool 104. The threaded end of the shank 102 is mounted in the socket 110 of the ram.

The lower end of the shank is formed with a tapped hole 112 for mounting a locking screw 114.

A threaded plug 116 is engaged with the threaded portion 104 of the shank and is movable toward and away from its lower unthreaded end. A spacer 118 is disposed in the bore between the plug 116 and the end of the tool 104. The spacer 118 has a diameter which substantially corresponds to the diameter of the unthreaded portion of the bore and a predetermined length. Normally, the spacer 118 forms part of a set of spacers, each having a different length so that the cutting end of the tool 104 can be mounted at various distances below the ram. When the tool 104 is mounted in place, its upper end is bottomed against the spacer 118 which in turn is bottomed against the threaded plug 116 so that the tool is firmly backed up against a surface that is substantially transverse to its longitudinal axis and to its downward motion as it is advanced in a cutting stroke.

In this form of the invention the tool 104 has an elongated midsection 120 which provides means for spacing a cutting gear 122 carried on its lower end a sufficient distance below the ram so that the ram clears the blank as it moves in its cutting and return strokes. This varies from the embodiment of the FIGS. 1 to 3, in which the extended portion between the cutting gear and the ram is formed on the shank.

The upper end of the tool 104 is adapted to be received within the lower end of the bore 106 of the shank and has a longitudinal flat 124 that registers with the tapped hole 112 so that the locking screw 114 can lock the tool 104 against rotation with respect to the shank as well as against separation from the spacer and the plug.

It can be seen that in this form of the invention, the tool is also rigidly backed up in its downward cutting stroke because it is bottomed against a flat surface that is substantially transverse to its longitudinal axis as well as its cutting motion. The locking screw 114 allows the tool 104 to be quickly separated from the shank to allow the insertion of a tool having a cutting gear of a different pitch. In addition, when the machine has been set up to cut gears of a given pitch, the cutting gear can be replaced without moving the shank from the machine. The position of the cutting gear can be quickly varied to accommodate a gear blank of a different thickness by replacing the spacer 118 with a spacer having either a greater or lesser length.

It is to be understood that although we have described but two preferred embodiments of our invention, various changes and revisions can be made therein without departing from the spirit of the invention or the scope of the appended claims.

We claim:
1. In a gear-shaping machine, the combination comprising:
   a. an elongated shank having first engageable means including an abutment surface formed transversely to the longitudinal axis of the shank;
   b. means on said machine for removably mounting said shank for a reciprocating motion between a pair of positions longitudinally spaced with respect to its longitudinal axis and for rotation about said longitudinal axis;
   c. a tool having a cutting gear and second engageable means complementary with the first engageable means on said shank and engageable therewith by a motion in which the tool and the shank are moved toward one another parallel to the longitudinal axis of the shank to a bottomed position in which the tool abuts the abutment surface of the shank;
   d. locking means on said shank and said tool comprising a flat surface on said tool and cooperating means on said shank adapted to engage said flat surface to positively lock said tool against rotation relative to said shank;
   e. securing means on said shank for releasably securing the tool against separation from its bottomed position so that the cutting gear is supported on the shank for engaging a gear blank in a cutting stroke in which the cutting gear has a component of motion parallel to the longitudinal axis of the shank; and
   f. said shank having a bore of constant diameter extending between its longitudinal ends, one end of the bore being adapted to receive a portion of the tool, and including a spacer member of a predetermined length and formed with an abutment being disposed in said bore with said abutment surface in contact with said tool, and means for mounting said spacer member in said bore spaced from the end of the shank through which the tool is received so that the cutting gear extends a predetermined distance beyond the end of the shank.

2. The combination as defined in claim 1, in which said bore has an internally threaded portion and including a threaded fastener engaged in said threaded portion for movement in said bore to a selected position with respect to the end of the shank through which the tool is received in which the spacer member is retained between the threaded fastener and the tool.

3. The combination as defined in claim 1, in which the means for securing the tool against separation in its bottomed position and said means to positively lock said tool against rotation include the portion of the tool that is receivable within the bore of the shank being formed with a longitudinal extending flat, and a locking screw threadably mounted in the shank for engagement with the flat.

4. A gear-shaping tool comprising:
   a. an elongated shank having a bore of constant diameter extending between its opposite longitudinal ends, said bore being threaded adjacent one end of the shank, and said shank having a tapped hole adjacent its opposite end which extends laterally outwardly from the bore, said tapped hole being formed for mounting a locking screw;
   b. an elongated tool having a cutting gear formed on one end and its opposite end being receivable in the bore of the shank, the portion of the tool that is receivable in the shank having a longitudinally extending flat;
   c. a spacer member disposed in the bore of the shank in abutment with the end of the tool, said spacer member having a predetermined length parallel to the axis of the bore;
   d. a plug engaged with the threaded end of the bore in abutment with the spacer member; and
   e. a locking screw mounted in the tapped hole to engage the flat on the tool to secure the tool against separation from said shank and to positively lock said tool against rotation relative to said shank.